US006967677B1

(12) United States Patent
Gfeller

(10) Patent No.: US 6,967,677 B1
(45) Date of Patent: Nov. 22, 2005

(54) MICROSCAN GUIDANCE

(75) Inventor: Karl Gfeller, Langwiesen (CH)

(73) Assignee: Sinar AG, Feuerthalen (CH)

( * ) Notice: Subject to any disclaimer, the term of this patent is extended or adjusted under 35 U.S.C. 154(b) by 859 days.

(21) Appl. No.: 09/663,338

(22) Filed: Sep. 15, 2000

(51) Int. Cl.[7] .................. H04N 5/228; H04N 5/225
(52) U.S. Cl. ............... 348/208.99; 348/373; 348/374
(58) Field of Search ..................... 348/219.1, 373, 348/208.99, 208.3, 374, 220.1, 342, 360

(56) References Cited

U.S. PATENT DOCUMENTS

| 4,894,672 | A | * | 1/1990 | Tanaka .................. 396/79 |
| 4,920,418 | A | * | 4/1990 | Robinson ............... 348/219.1 |
| 5,101,278 | A | * | 3/1992 | Itsumi et al. ........... 348/357 |
| 5,315,411 | A |   | 5/1994 | Blanding |
| 6,236,430 | B1 | * | 5/2001 | Suzuki et al. .......... 348/219.1 |
| 6,577,341 | B1 | * | 6/2003 | Yamada et al. ......... 348/272 |
| 6,670,986 | B1 | * | 12/2003 | Ben Shoshan et al. ... 348/219.1 |

FOREIGN PATENT DOCUMENTS

| EP | 0804039 | 10/1997 | |
| JP | 10285 475 | * 10/1998 | .......... H04N 5/335 |

OTHER PUBLICATIONS

Patent Abstracts of Japan, vol. 1999, No. 1, Jan. 29, 1999 of JP 10 285 475 of Oct. 23, 1998.

* cited by examiner

Primary Examiner—Wendy R. Garber
Assistant Examiner—Kelly L. Jerabek
(74) Attorney, Agent, or Firm—Dykema Gossett

(57) ABSTRACT

A device in the form of a flat matrix of optoelectric transducer elements is mounted in a camera so that the flat matrix is perpendicular to an axis of an imaging beam in the camera and is movable in a pre-selected direction perpendicular to the imaging beam axis by a support apparatus which includes transfer levers that are tiltable about three swivel axes that are parallel and extend perpendicularly to the preselected direction.

21 Claims, 2 Drawing Sheets

MICROSCAN GUIDANCE

BACKGROUND OF THE INVENTION

The present invention relates to a method for linear guidance of motion of limited extent in a preselected direction of a device that is operating in the imaging beam of a camera in relation to a reference system at the camera. The invention relates further to an arrangement for guidance of such a movement.

The invention is based on problems that develop in the area of the digital camera technology, particularly that of the digital still camera technology, and especially in the area of the multi-shot technology thereof.

Basically in multi-shot technology, the matrix of optoelectric transducer elements commonly called pixel matrix, for instance a CCD area chip, is shifted two or more times in the imaging beam path and several images are registered by triggering a respective partial image storage. These are processed into an unitary image result. Thereby one makes sure that at each image point of the image beam, all the selective transducer elements become effective, usually selective on the three primary colors. It is therefore necessary that the pixel matrix is shifted sequentially relative to the imaging beam and sequential partial images are registered, respectively. It is of crucial importance for the quality of the resulting image that the mentioned pixel matrix shift occurs in a highly precise and precisely repeatable manner, which applies to the displacement amount as well as to the displacement direction.

With respect to said multi-shot technology, I refer to the technical information brochure from RODENSTOCK Prazisionsoptik GmbH, Isartalstr. 43, D-80469 Munich, Germany, 4/99 W. E. Schön 9543 512 1512 (English) or 9543 512 1511 (German) having the title "Digitale Fotografie und ihre Ansprüche an das Aufnahmeobjectiv" or (in English) "Digital photography and its demands on the taking lens," with particular reference to the section "Another ingenious trick: scanning with the CCD area array for even better image quality."

This technical background information is intended to be an integral part of the present description.

From this technical area, the present invention focuses basically on the precise direction guidance of the transducer matrix in the imaging beam of a digital still camera. The invention specifically takes up the task to provide a method or an arrangement by which means a transducer-matrix movement guidance is made possible which is highly precise simple in construction and with low expenditures resistant to wear and abrasion.

By means of the following specified inventive solution of the problem of movement guidance in the specific context mentioned above, a movement guidance method or a corresponding arrangement is basically created that is deployable in any case where it is necessary to realize precise movement of a device operating in the imaging beam of a camera. This may also be, for example, the movement of a color filter matrix.

The stated object is achieved by a method of the kind as mentioned above in that the device is moved at least with a movement component in the preset direction and whereby the exclusiveness of the movement in said direction is ensured by a bending connection of the device relative to the reference system, about swiveling axes that are parallel to each other and perpendicular to said direction.

For realization of the inventive, desired precise linear movement guidance there is this not realized a translatory guidance in the desired direction but, according to the invention, precise guidance is guaranteed by swivel bearings. Thereby there is achieved on one hand the required high guidance precision and translatory guidances are not used on the other hand, as for example ball bearing guidances, etc. Thereby also the other requirements are totally fulfilled according to the invention in terms of simplicity in construction, minimum clearance, and resistance to wear and abrasion.

Whenever said device, specifically a matrix of optoelectric transducers, is not only to be guided precisely and linearly in one preset direction—independent whether the movement drive operates precisely only in said direction or whether it produces additional drive components in a perpendicular direction thereof but is to be guided along two mutually perpendicular of such preset directions (in the sense of a X-Y stage guidance), then two of said bending connections are provided, which swiveling axes being respectively perpendicular to one of said directions. Thereby the device may be moved in any direction in one plane—as in an X-Y stage. Concerning the drive (force) in the particular directions, there is the fact that only and exclusively the drive components become effective in the particular preset directions. Thereby precise and reproducible movement control is made possible, within limits independent from the fact whether the direction-specific preset drives create additional drive components or not—in addition to drive components in the said preset direction. It is not imperative but it is preferred that the guided directions are mutually perpendicular as in a common X-Y stage guidance. They are more generally warped at an angle and so are the particular swiveling axes therefore.

The inventive method is preferably deployed in a digital camera, particularly a digital still camera, especially for guiding of an optoelectric transducer array, preferably a CCD or CMOS image sensor array in the imaging beam. This is especially deployed for the movement of the transducer array in the multi-shot technology.

As a solution to the stated task according to the invention, the arrangement of the type as mentioned in above is characterized by the fact that a coupling arrangement is provided for a drive between the reference system and the device, a plane movement guide for the device is provided, a hinge connection to the device that has at least three swiveling axes, which are spaced apart and are parallel to one another, and which lie parallel to said plane.

As an example, the invention is described below with reference to drawings.

DETAILED DESCRIPTION OF THE PREFERRED EMBODIMENTS

Figure 1:
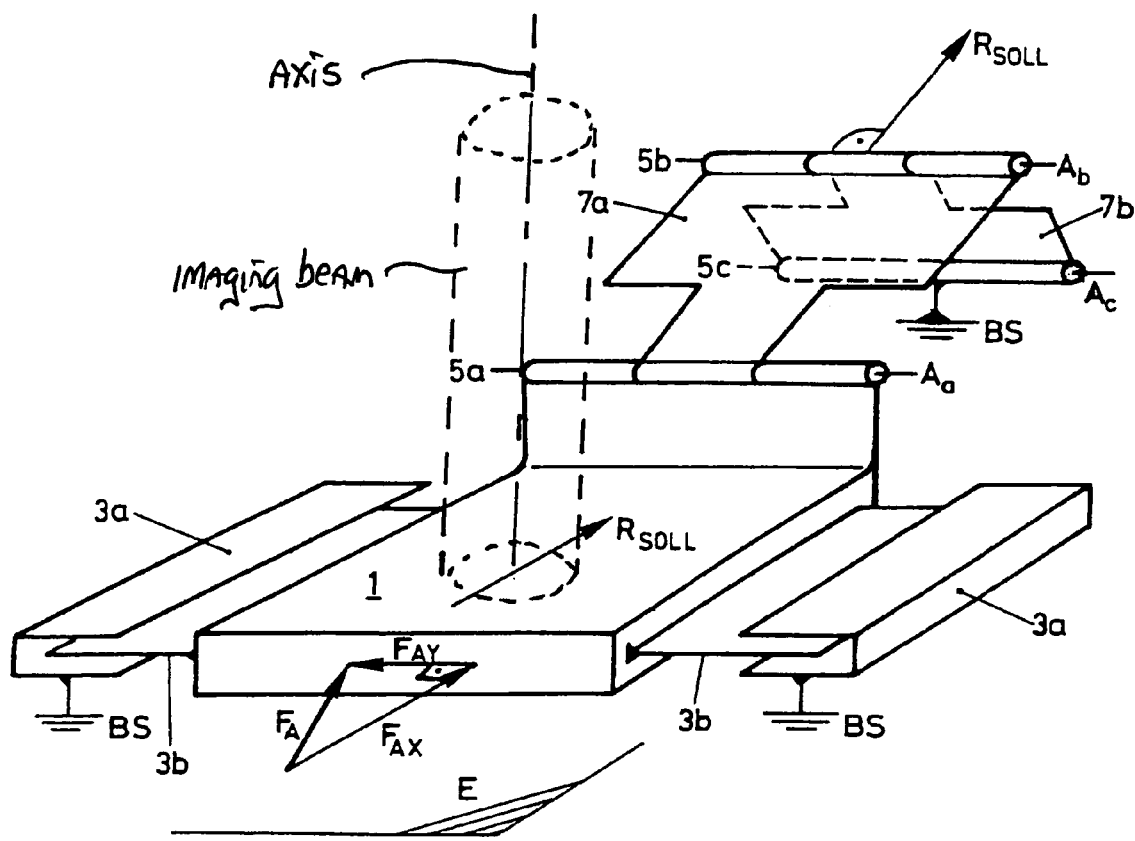
FIG. 1 shows schematically an arrangement according to the invention to illustrate the principle of the inventive method and FIG. 2 shows a perspective view of an arrangement according to the invention, which operates according to the inventive method as a preferred embodiment for the movement guide of a matrix of optoelectric transducers within the area of the multi-shot technology in to a still camera.

In FIG. 1 there is illustrated a simplified arrangement according to the invention in a perspective and schematic view through which the innovative method is to be described. A device 1, particularly a matrix of optoelectric transducers in a digital camera, particularly a still camera, is movable in a plane E relative to a reference system BS as this is shown schematically with a guide 3a on the reference-system-side and with the guide 3b on the side of the device 1. A drive force FA is assumed to engage the device 1 in the plane E in an arbitrary direction whereby this direction may be dependent on time and/or dependent on the actual position (IST) of the device 1.

However, the device 1 shall be displaced by the engagement of the Force FA only and exclusively in the preset direction according Rsoll according to the force component FAx, and the transverse force component FAy shall remain without effect on the movement of the device 1. A traditional approach would be to conceive the guides 3a, 3b so that the forces FAy are absorbed by the guide bearings and only the forces in the preset direction Rsoll effect the movement—that is according to Fax. However, this calls for provision of precision guides with corresponding high expenditures and of translatory guides, which wear relatively easy and which basically tend to produce abrasion particles.

If one considers the extent of today's pixels of CCD matrixes in the order 10 micrometer sidelength, then one can see that abrasion particles may very well lead to impairment of the image quality.

A totally different approach is chosen according to the invention. As illustrated in FIG. 1, the device 1 is joined to the reference system via a first hinge 5a with the swiveling axis Aa, a first transfer lever 7a, a second hinge 5b with axis Ab and a second transfer lever 7b, as well as a third hinge 5c with axis Ac. The at least three hinge axes or swiveling axes Aa through Ac to be provided are parallel to one another and—as the expert in the field can easily see—not all three axes may lie in the plane E, which is the guide plane of the device 1.

Furthermore, the alignments of the parallel axes Aa through Ac are exactly perpendicular to the preset direction Rsoll.

In regard to construction expenditures, minimal or lack of any clearance, abrasion and wear one can easily see that the swiveling bearings to be provided are considerably more advantageous than any type of translatory guide.

Figure 2:
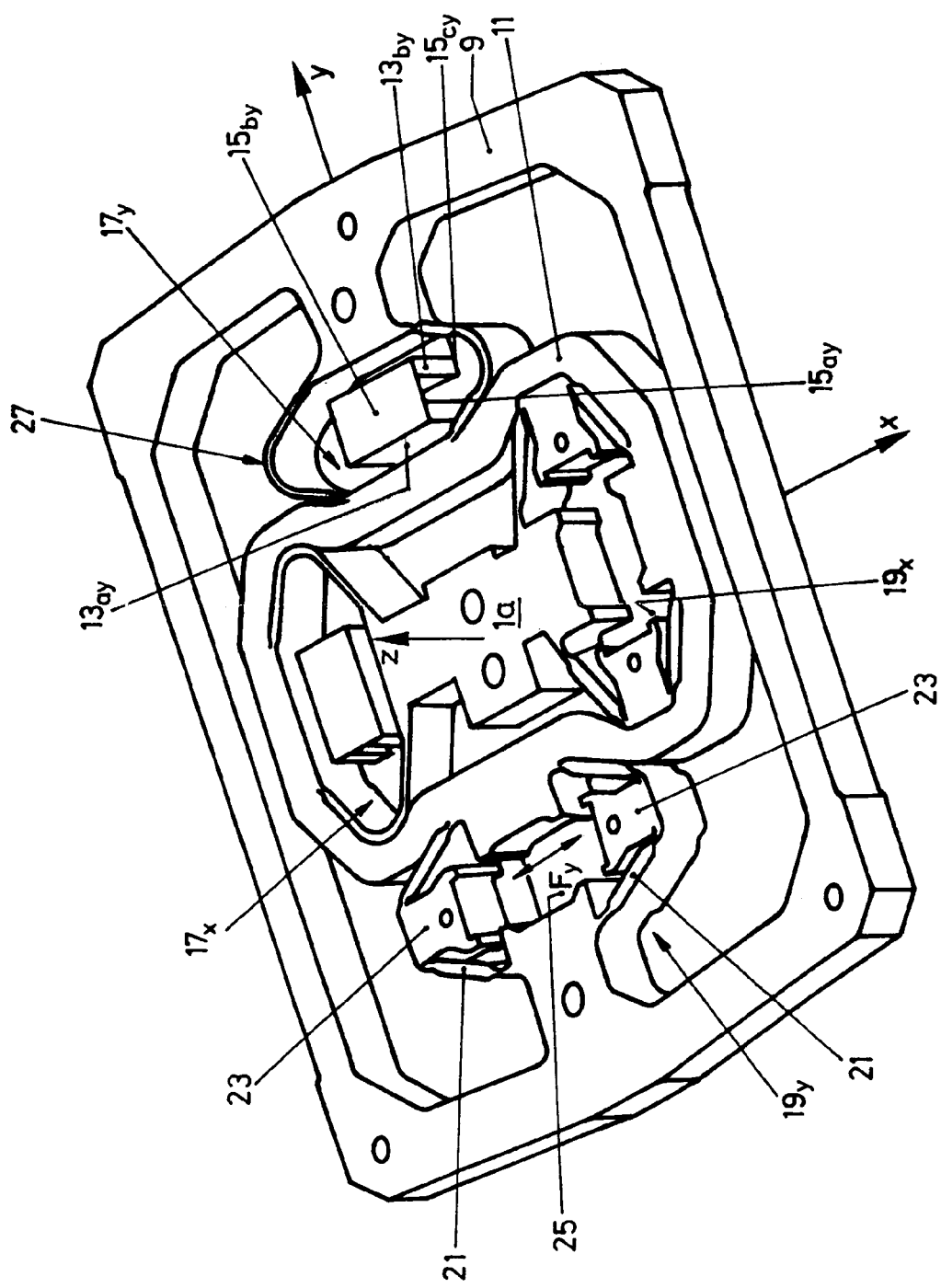

FIG. 2 illustrates an arrangement in a perspective view that consequently follows the principal as explained with the aid of FIG. 1, and which is intended to serve as a movement guide of a matrix of optoelectric tranducer elements, particularly a CCD matrix, in a digital camera, to realize the multi-shot method.

According to the arrangement of FIG. 2, there is provided a center area 1a whereon the device is mounted that is to be guided and moved according to the invention, particularly a CCD matrix.

The two specifically present (SOLL) movement directions to be controlled lie in the orthogonal axes x, y according to FIG. 2. According to the invention, there is frame 9 integrated with frame 11 that is movable in the y-direction, similar to a X-Y stage, whereby the frame 9 serves for mounting to a camera component, which is one of the reference systems. The frame 11 and the support 1a for the device 1 are rigidly connected with respect to the y-direction. The hinge arrangement, which is provided for precise stabilization of the movement in y-direction, corresponds to the one as described in FIG. 1 and is marked 17y. The hinge arrangement includes hinge 15cy, which is designed as a thin-layer hinge and which is disposed between frame 9 and a first transfer lever 13by. The swiveling axis of hinge 15cy lies exactly in the x-direction.

The transfer lever 13by is connected via an further thin-layer hinge 15by to a further transfer lever 13ay whereby the latter lever is connected via still further thin-layer hinge 15ay to the frame 11 (covered up in the illustration in FIG. 2). All swiveling axes of the thin-layer hinges 15ay through 15cy lie in the x-direction, thus perpendicular to the y-direction to be guided therefrom.

On the side of the frame 11 opposite to the hinge arrangement 17y considered in y-direction, there is provided the receiving arrangement or the coupling arrangement 19y for the y-drive for the movement of the support 1a for the device 1 in the y-direction. The frame 9 is there linked to the frame 11 by four pantograph arms 21. There is provided also a pair of coupling elements 23 that are disposed cross-wise, which means in x-direction, and they are aligned with a support 25 for a piezo-drive element (not shown) that is rigidly connected to the frame 9. The pantograph arms 21, which are attached by thin layer hinges, are sized in width in the z-direction in such a manner that they ensure a solid suspension of frame 11 within frame 9 in the z-direction together with connecting springs 27 which are joined by a thin-layer hinges between frame 9 and frame 11 in the area of the hinge arrangement 17y.

If a drive force Fy is generated by a piezo-drive element that is disposed in the support 25 acting on the coupling elements 23, then the pantograph width is changed, i.e. spread-out or retrieved—set back by the effect of springs, particularly of the spring elements 27. Thereby the frame 11 is displaced in ±y-direction. The hinge arrangement 17y ensures thereby that even when the drive on the frame 11 would not occur exactly in the y-direction (for example, because of tolerance) via said pantograph, then this would be forced so that, e.g., with the aid of a preferably negative feedback controlled steering of the piezo-drive in the support 25, there is exclusively and precisely realized a displacement of the frame 11 in the ±y-direction.

Within the frame 11 there are provided the drive measures and the guide measures for the support 1a in the x-direction. They are configured completely analogously as the corresponding drive measures and guide measures that are effective in the y-direction between frame 9 and frame 11 and as just described. For reasons of clarity in the overall view, all individual Parts are not described any further, but illustrated in FIG. 2 is the hinge arrangement 17x ensuring guidance in the x-direction. 19x illustrates an x-drive arrangement for a correspondingly inserted piezo-drive element engaging again via pantograph arms.

With the described arrangement it is possible to move in any desired way the support 1a and the device 1 that is mounted thereon precisely in a micrometer range in the plane set by the directions x and y. Nevertheless, it is ensured that the y-displacement drive in support 25 controls exclusively movements in the y-direction and, correspondingly, the x-drive controls the drive unit 19x exclusively in the x-direction. It is thereby achieved that by preferably negative feedback controlled steering of the piezo-drive elements, a precise and reproducible positioning of the device 1 is realized, which means precise displacement of the transducer-element matrix in the imaging beam of the digital camera (not shown).

As illustrated in FIG. 2, the entire inventive arrangement is preferably constructed integral in one piece, aside of the drive elements, and is made preferably of metal such as of a bronze, brass, steel or aluminum. Relatively large manufacturing—tolerances may be accepted nevertheless, the provided hinge connections (see 17x and 17y) ensure the above-mentioned definite and precise drive transmission and drive guidance.

What is claimed is:

1. A method for guiding a device to move linearly a limited extent in a preselected direction that is perpendicular to an axis of an imaging beam of a camera and with respect to a reference system of said camera, comprising the step of ensuring movability accurately and exclusively in said preselected direction by a link of said device to said reference system movable in at least three articulate areas having articulate structural axes which are mutually parallel and perpendicular to said preselected direction.

2. The method of claim 1, further providing a further link of said device to said reference system movably at at least three further articulate areas having respective further articulate axes being mutually parallel and being perpendicular to said articulate axes so as to guide said device additionally in a direction perpendicular to said preselected direction.

3. The method of claim 1 or 2, wherein said device is operating in the imaging beam of a digital camera.

4. The method of claim 1 or 2, wherein said device is operating in the imaging beam of a digital still image camera.

5. The method of claim 1 or 2, wherein said device comprises an array of optoelectric transducers.

6. The method of claim 1 or 2, wherein said device comprises an array of CCD or of CMOS image sensors.

7. The method of claim 1 or 2, wherein said guiding is performed during multishot operation with said camera.

8. A guiding arrangement for linear movement of a device carrier in a preselected direction that is perpendicular to an imaging beam axis of an optical imaging system, said guiding arrangement comprising a link for said device carrier to a reference system at said optical imaging system, said link being exclusively movable about at least three articulate axes which are mutually spaced, mutually parallel and perpendicular to said preselected direction.

9. The arrangement of claim 8, further comprising a further link between said device and said reference system with at least three further articulate axes mutually spaced, mutually parallel and parallel to said plane and further at an angle to said articulate axes.

10. The arrangement of claim 9, wherein said further articulate axes are perpendicular to said articulate axes.

11. The arrangement of claim 8 or 9, wherein at least a part of said articulate axes are articulate axes of a thin layer hinge or of a film hinge.

12. The arrangement of claim 8 or 9, wherein said link and/or said further link comprises a pantograph arrangement.

13. The arrangement of claim 8 or 9, further comprising at least one movement drive comprising at least one piezo element.

14. The arrangement of claim 8 or 9, comprising at least one piezo drive element operationally connected via a pantograph arrangement to said device.

15. The arrangement of claim 8 or 9 being designed as a module.

16. The arrangement of claim 15, said module being of one piece.

17. The arrangement of claim 8 or 9 within a camera, said device comprising a matrix of optoelectrical transducers.

18. The arrangement of claim 8 or 9, wherein said device comprises CCD or CMOS image sensors.

19. An apparatus which can be mounted to a camera which defines an imaging beam axis therein, said apparatus comprising:

a device which extends perpendicularly to said imaging beam axis, said device also defining a first hinge, a first transfer lever having first and second ends, said first end being connected to said first hinge so as to be tiltable therearound and said second end defining a second hinge so as to be tiltable therearound and said second end defining a second hinge which extends in parallel with said first hinge, and a second transfer lever having first and second ends, said first end thereof being connected to said second hinge so as to be tiltable therearound and said second end thereof defining a third hinge which extends in parallel with said first and second hinges, said third hinge being mountable to a camera so that said device can be linearly moved a limited distance in a direction perpendicular to said imaging beam axis.

20. An apparatus according to claim 19, wherein said device comprises an array of optoelectric transducers.

21. An apparatus according to claim 19, wherein said device is generally rectangular and said first, second and third hinges extend in respective planes parallel to said imaginary plane.

* * * * *